United States Patent

[11] 3,626,472

[72] Inventor Edward William Rowland-Hill
 New Holland, Pa.
[21] Appl. No. 879,214
[22] Filed Nov. 24, 1969
[45] Patented Dec. 7, 1971
[73] Assignee Sperry Rand Corporation
 New Holland, Pa.
 Continuation-in-part of application Ser. No. 790,145, Jan. 9, 1969. This application Nov. 24, 1969, Ser. No. 879,214

[54] MEANS FOR FEEDING CROP MATERIAL TO AN AXIAL FLOW THRESHING AND SEPARATING COMBINE
 13 Claims, 9 Drawing Figs.
[52] U.S. Cl. .................................................... 130/27 T
[51] Int. Cl. .................................................... A01f 7/06
[50] Field of Search .......................................... 130/27 R, 27 T, 26, 24; 56/20, 21

[56] References Cited
 UNITED STATES PATENTS
 3,439,683 4/1969 Keller ............................ 130/27 T
 3,464,419 9/1969 Knapp et al. .................... 130/27 T
 2,098,860 11/1937 Creech ........................... 56/21

*Primary Examiner*—Antonio F. Guida
*Attorneys*—Joseph A. Brown, John C. Thompson, James J. Kennedy and George C. Bower ABSTRACT: A combine has two axial flow type threshing and separating means each comprising a generally horizontal and cylindrical casing with longitudinally extending concaves and grates and a rotor on an axial shaft within the cylindrical casing having rasp bars and blades cooperating with the concaves and grates, respectively, to thresh and separate grain from crop material. On the forward end of the shaft are auger flights for feeding crops to the rasp bar bearing rotor and the concaves. A ramp means extends downwardly and forwardly from midportions of the auger flights to the bottom wall of the crop elevator. The crop is delivered by a crop elevator to the ramp means for directing the crop upwardly into midportions of the auger flights. The auger flights and stripper bars on the sides of the casings cooperate to deliver the crop material to the rasp bar bearing rotors at the ends of the respective threshing actions.

INVENTOR
EDWARD WILLIAM ROWLAND-HILL

INVENTOR.
EDWARD WILLIAM ROWLAND-HILL
BY

INVENTOR.
EDWARD WILLIAM ROWLAND-HILL
BY

INVENTOR.
EDWARD WILLIAM ROWLAND-HILL
BY

MEANS FOR FEEDING CROP MATERIAL TO AN AXIAL FLOW THRESHING AND SEPARATING COMBINE

RELATED APPLICATIONS

This is a continuation-in-part of my Pat. application Ser. No. 790,145, filed on Jan. 9, 1969, and entitled "An axial Flow Threshing and Separating Machine."

BACKGROUND OF THE INVENTION

This invention relates to axial flow-type combines and is directed particularly to the feeding of the crop material to the threshing and separating means.

Axial flow-type combines have a generally cylindrical casing with a concave and succeeding grate for cooperating with rasp bars and blades mounted on a rotor to form a threshing and separating section and a separating section. The crop material is fed to the threshing and separating section and formed in a mat which is carried around by the rotor for threshing the crop material. Flights are usually provided along the inner surface of the casing to move the crop material axially through the casing.

The crop material is fed to the threshing and separating section of the machine in various ways. One method is to drop the material through an opening in the upper wall of the cylindrical casing onto paddles or augers in front of the threshing and separating section. The paddles and augers move the crop material axially into the threshing and separating section. Another method is to deliver the crop material in a generally longitudinally direction into the ends of auger flights. The flights engage the crop material and carry it into the threshing and separating section. In some instances the crop material is dropped directly into the threshing section.

These various forms of introducing the crop material into the threshing and separating means have the disadvantages of inconvenience of delivery or incapability of receiving and handling crop material at a rate which matches the speed of the processing of the crop material by the threshing and separating means. The feeding of the crop material axially or longitudinally into the end of an auger flight has a disadvantage that with a rapidly rotating auger blocking of the entering crop may occur. This reduces the capacity of the combine in comparison with the potential of the threshing and separating means. The feeding of the crop material through an opening in the top of the cylindrical casing may be satisfactory for stationary threshing and separating machine. It is unsatisfactory for mobile threshing and separating machines such as combines. The crop elevator from the header must carry the crop material up the front of the combine. This is inconvenient in that it presents problems to the design of the crop elevator and mounting the crop elevator and header on the combine. The crop elevator must be made larger, heavier and longer to accommodate the greater distance to the opening in the top of the cylindrical member. Thus these means for feeding crop material to the threshing and separating section are unsatisfactory.

It is further desirable that the crop is introduced into the threshing and separating section so that the rotor has ample time to form a crop mat for an efficient and rapid threshing and separation of the grain.

Also, in the front end feeding of crops it is desirable that long grasses do not wrap at the bearing end of the shaft causing bearing failure or overheating.

The purpose of this invention is to provide a crop-feeding means in the threshing and separating section of an axial flow unit which utilizes standard crop elevators and provides for a rapid introduction of the crop material from the crop elevator to the threshing and separating section in a manner for proper distribution of the crop material in the threshing and separating section. A further purpose is to prevent wrapping of grasses around the front end of the shaft supporting the rotors.

OBJECTS AND SUMMARY OF THE INVENTION

An object of the invention is to rapidly and continuously feed large quantities of crops to the threshing and separating section of an axial flow-type threshing and separating combine.

Another object of the invention is to provide a feed means to a threshing and separating section on a mobile combine that utilizes conventional crop elevators for delivering the crops to the feeding means.

Another object of the invention is to provide a crop-feeding means that delivers the incoming crops to the threshing and separating means at the end of the preceding threshing action.

Another object of the invention is to provide means for feeding crop material to an axial flow-type threshing and separating means which requires a minimum of space between the threshing and separating means and the crop elevator.

Another object of the invention is to provide a means for feeding crops to an axial flow-type threshing and separating means that handles all types of crop material.

Another object of the invention is to provide means for protecting the front bearing supporting the rotating shaft of the threshing and separating means from the wrapping of incoming material.

In summary the crop-feeding means comprises axial feeding means for delivering crops to the threshing and separating section and ramp spaced below the feeding means for guiding crops upwardly and intermediately into said axial feeding means for delivery to the threshing and separating section.

These and other objects and advantages of this invention will be apparent from the following description and claims taken in conjunction with the accompanying drawings which illustrate the various features of this invention.

DESCRIPTION OF THE PREFERRED EMBODIMENT

Introduction

Figure 2:
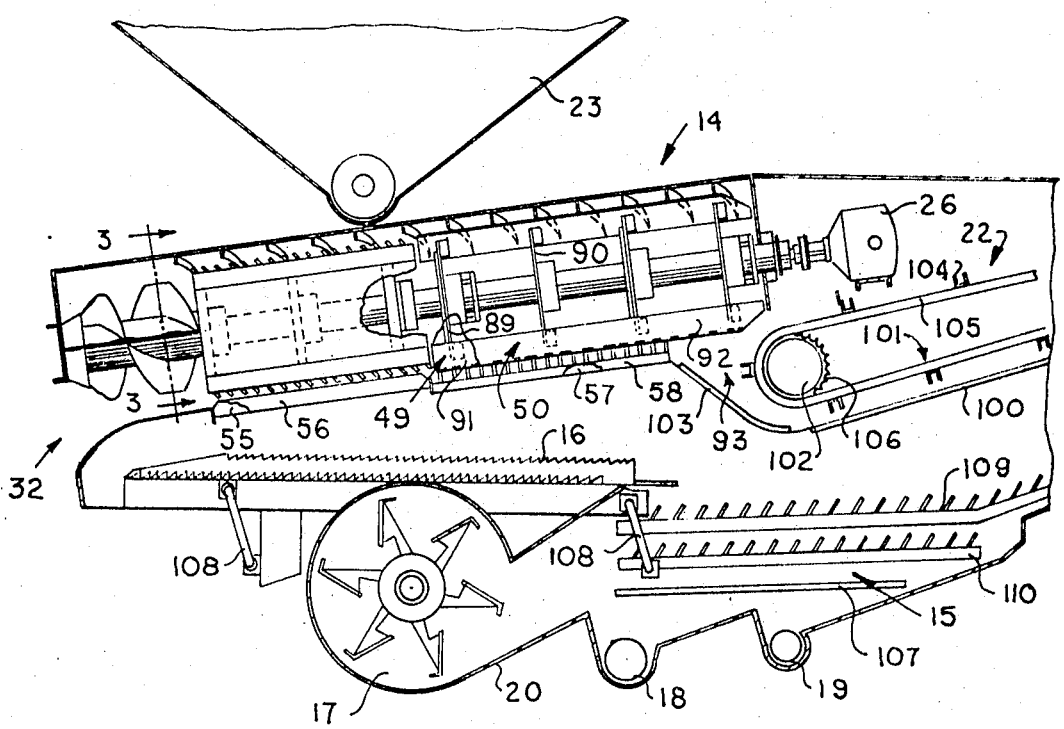
FIG. 2 is an axial sectional view of the crop-feeding feeding means, the axial threshing and separating means, the discharge conveyor and the grain cleaning and handling means.
Figure 1:
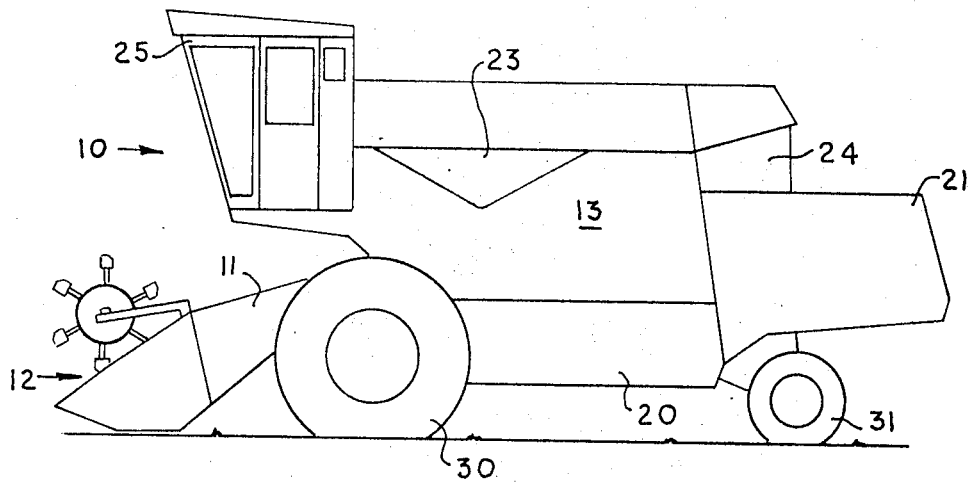
FIG. 1 is a side view of an axial flow-type combine with a header and a crop elevator mounted on front.

In FIG. 1 the combine 10 is exteriorly illustrated with a crop elevator 11 and header 12 mounted on front. The main frame or housing 13 of the combine internally supports the crop threshing and separating means 14, the grain-cleaning means 15 and the grain pan 16, shown in FIG. 2. The rear housing 21 encloses the discharge conveyor 22 extending rearwardly from the threshing and separating means. On top of the combine is the grain tank 23 and the internal combustion engine 24 positioned to the rear of the tank. The blower 17, grain auger 18 and tailings auger 19 are enclosed in the lower housing 20 underneath the main frame or housing 13. The operator's cab 25 extends forwardly from the main housing 13 and over the crop elevator 11 for a clear view of the header 12. The combine is conventionally supported by two large drive wheels 30 on front and two small steering wheels 31 on the rear.

The threshing and separating means 14 extends longitudinally in the direction of movement of the combine and has the crop-feeding means 32 at the front for receiving crop from the header and elevator. The crop is then carried axially and circumferentially to thresh and separate the grain from the crop material and discharge the crop material without the grain at the rear to a conveyor which carries the crop material rearwardly for discharge from the combine.

In this preferred embodiment the threshing and separating means is described as two units in adjacent side-by-side relation. However, the invention described and shown in this embodiment is equally applicable to a single threshing and separating unit.

Threshing and Separating Means

The units 33,34 have generally cylindrical casings 35,36 and rotatable shafts 37,38 extending along the axes A,B of the respective casings. The shafts 37,38 support the feeding augers 45,46, threshing rotors 47,48, and separating rotors 49,50 in the respective casings. The casings, respectively, have longitudinally extending concaves 55,56 and grates 57,58 along the bottom and curved vanes 59,60 on the inner side of the tops of the casings. The threshing rotors 47,48 cooperate with the respective concaves 55,56 to thresh and separate grain from the crops and the separating rotors 49,50 cooperate with the grates 57,58 to separate any grain that is entrained in the crop material. The feeding augers 45,46 are between the threshing rotors and the front walls 56,66 which partially closes the front end of the casings.

Considering the threshing and separating units 33,34, the casings 35,56 have walls extending circumferentially around the respective rotors from one side edge of the respective concaves and grates to the other side edge. These walls are formed by the curved casing top portions 67,68 extending between the secured to the center beam 69 and the side beams 71,72, the center beam 69, side beams 71,72 and curved portions extending from the respective beams to the concaves and grates. The curved vanes 59,60 are mounted on the top portions 67,68, respectively, and axially spaced along the axial length of the top portions to move the crop material axially as it is rotated by the threshing and separating rotors. The concaves have longitudinally extending concave bars and curved transverse rods. The bars are supported by curved transverse beams. The front portion of the casing with the crop feeding means will be described later herein.

The threshing rotors comprise generally elliptically shaped spiders 73,74 firmly attached to the respective shaft 37,38 in axial spaced relation and having the long diameter portion extending adjacent to the casing. The spiders have flanges 75,76 with angled bars 77.78 mounted on the edges adjacent to the casing and have an inwardly extending portion facing in the direction of rotation and a circumferential portion supporting the rasp bars 87,88, respectively. Solid sheet metal members 85,86 are mounted on opposite sides of the rotor and extend the length and width of the rotor to close the spaces between the spiders. The concaves 55,56 may be adjustable to vary the spacing between the rasp bars 87,88 and concaves 55,56 depending upon the type and condition of the crop to be harvested. The elliptical shape of the spiders 73,74 imparts an elliptical shape to the enclosed rotors which forms with the casing axially extending spaces C,D on each side of the respective rotors. This provides easy passage of crops through the casing and any debris that may be picked up by the header and conveyed to the threshing and separating units.

The separating rotors 49,50 also have spiders 89,90 firmly attached in axially spaced relation to the shafts 37,38 for longitudinally supporting blades 91,92 extending axially adjacent to the casings 35,36 at the ends of the spiders. The elliptical shape of the spiders 89.90 and the end mounting of the blades also provides axial space between the separating rotors and the casing for passage of debris.

The casings and separating rotors extend axially beyond the end of the grates 57,58 to form a discharge opening 93 at the end of the separating grates. This discharge opening at the rear bottom of the casings provides for the passage of the remainder of the grainless crop. Beams 95,96 at each end of the casings are secured to the main frame of the combine. The shafts are rotatably mounted in bearings 97,98 supported by these transverse beams on the outer side of the front and rear walls of the casings. The shafts are driven through variable speed drive means (not shown) connected between the internal combustion engine 24 and the gear transmissions 26 at the rear of the units. The rotors may be rotated over a range of speeds depending upon the type and condition of the crop.

Discharge Conveyor

The threshing and separating units are inclined upwardly toward the rear and the discharge conveyor 22 is at a lower level to partially overlap the discharge end of the threshing and separating units and extend rearwardly at a slightly upwardly inclined angle. The discharge conveyor 22 comprises a bottom grate 100 and an endless conveyor 101 having chains 105 mounted on the front sprockets 106 on a front roll 102 and on the rear sprockets (not shown). A chute 103 slopes downwardly from the end of the separating grates 57,58 underneath the discharge openings and then curves slightly upwardly underneath the front end of the conveyor. The chute, bottom grate and conveyor extend transversely across the width of the combine to receive the discharged crop material from both units. The conveyor is of the undershot type and has transverse bars 104 attached to the chains 105 for gripping the crop dropped onto the bottom grate and sweeping it rearwardly along the bottom grate for further separation of any remaining entrained grain.

Grain Handling and Cleaning Means

The grain pan 16 and cleaning means 15 may be conventional. The grain pan 16 is mounted on pivoted linkages 108 and sloped downwardly towards the rear. The pan receives the separated grain passing through the concaves and separating grates and is oscillated fore-and-aft to shake and distribute the grain transversely and move it rearwardly for discharge onto the chaffer sieve 109. The chaffer sieve also reciprocated fore-and-aft for rearward movement of crop material and to pass grain and tailings onto the grain sieve 110. The crop material is discharged at the rear of the combine. The grain sieve 110 is also reciprocated fore-and-aft to separate the grain from the tailings so that the grain passes through the sieve into the grain auger 18 by means of the chute 107 and the tailings discharges at the rear end for delivery to the tailing auger 19. The grain in the grain auger 18 is delivered to the grain tank by elevator means (not shown) and the tailings are returned to the threshing and separating means by a means (not shown).

Crop-Feeding Means

The crop-feeding means is best illustrated in FIGS. 3–8 and receives the cut crop from the elevator 11 on the front of the combine and delivers it to the threshing rotors 47,48. The crop-feeding means generally comprises upper curved casing top portions 67,68; sidewalls 111,112; ramp 113; bottom transition portions 115,116 and augers 45,46.

The cylindrically shaped top portions 67,68 of the casings extend to the front walls 65.66 of the units. The side beams 71,72 and the center beam 69 also extend forwardly to join with the transverse beam 95 across the front of the combine. The sides 111,112 of the main frame and casing 13 of the combine extend forwardly to the front vertical beams 117,118 at the front side corners.

The bottom of the crop-feeding means is substantially different in shape from the casings 35,36. The ramp 113 is a linear element surface extending across the width of the combine. At the converging portions 115,116 the ramp has a convex portion 125 turning sharply downward into a downward sloping portion 126 of a generally concave shape to form an opening 120 with the transverse beam 95. The opening has a substantial height with a crop passing portion 120a below the pitch circle E of the auger flights. The crop elevator is mounted on the front of the combine by conventional pivotal attachment to the beams 117,118. The axis F of rotation of the upper sprockets 121 of the crop elevator 11 and of pivot of the crop elevator is substantially on the line of the pitch circle E of the auger flights. The cut crops are delivered by the undershot conveyor 124 across the width of the combine through crop passing opening portion 120a which is below the pitch circle E of the auger flights of the crop-feeding means. The bottom wall 122 of the crop elevator overlaps above the forward portion of the ramp and has a resilient sealing lip 123 engaging the ramp. The contour of the concave portion follows the pivotal movement of the elevator. The planar sidewalls 111,112 extend downwardly from the side beams 71,72 to the ramp to close the sides of the crop-feeding means.

Figure 3:
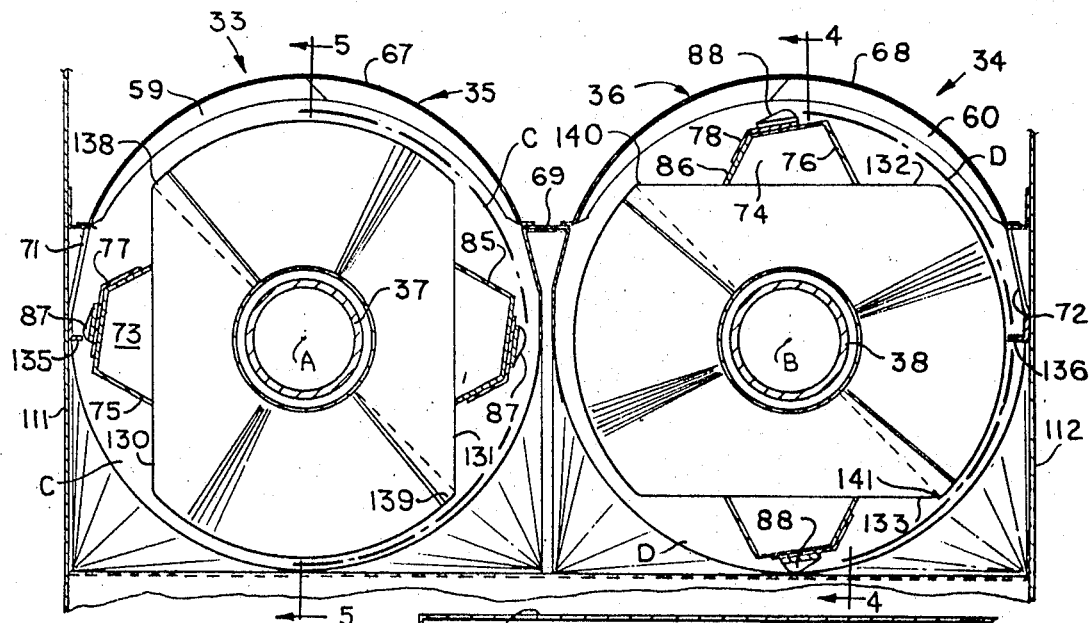
FIG. 3 is a sectional view taken along lines 3—3 of FIG. 2.
Figure 4:
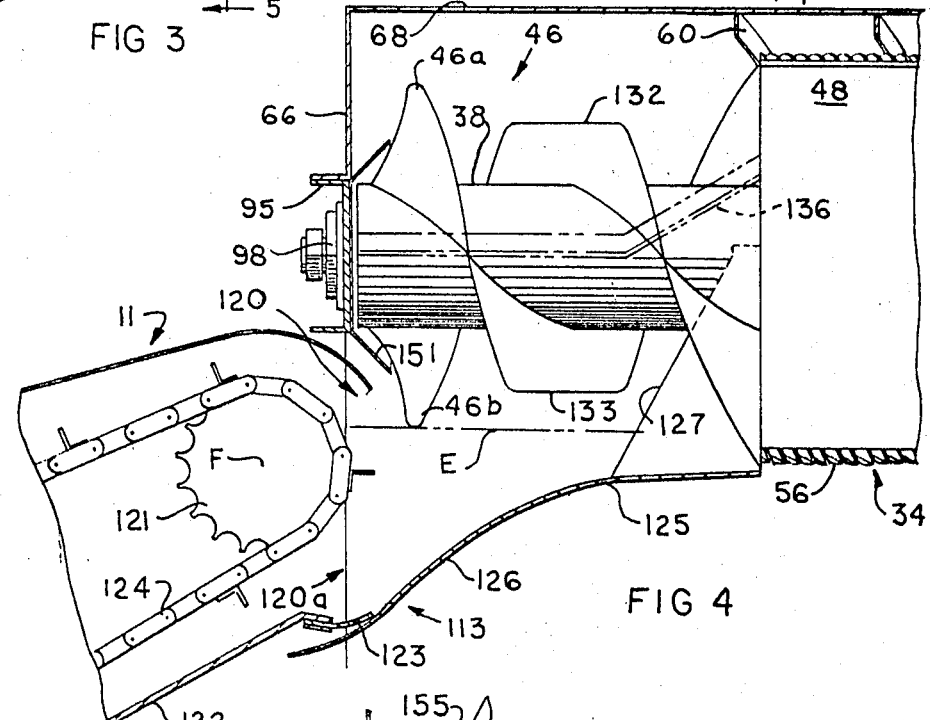
FIG. 4 is a sectional view of the crop elevator and left feeding means taken along the lines 4—4 of FIG. 3.

The two transition portions 115,116 extend rearwardly from the rear edge of the ramp and gradually change rearwardly into a cylindrical or circular shape to match the curved shape of the concaves. The two transition portions join to form a rearwardly sloped edge 127 between the two portions extending upwardly from the ramp to the center beam between the two units. The transition portions extend around on the sides to about the level of the axes of the casings (FIG. 3).

Figure 7:
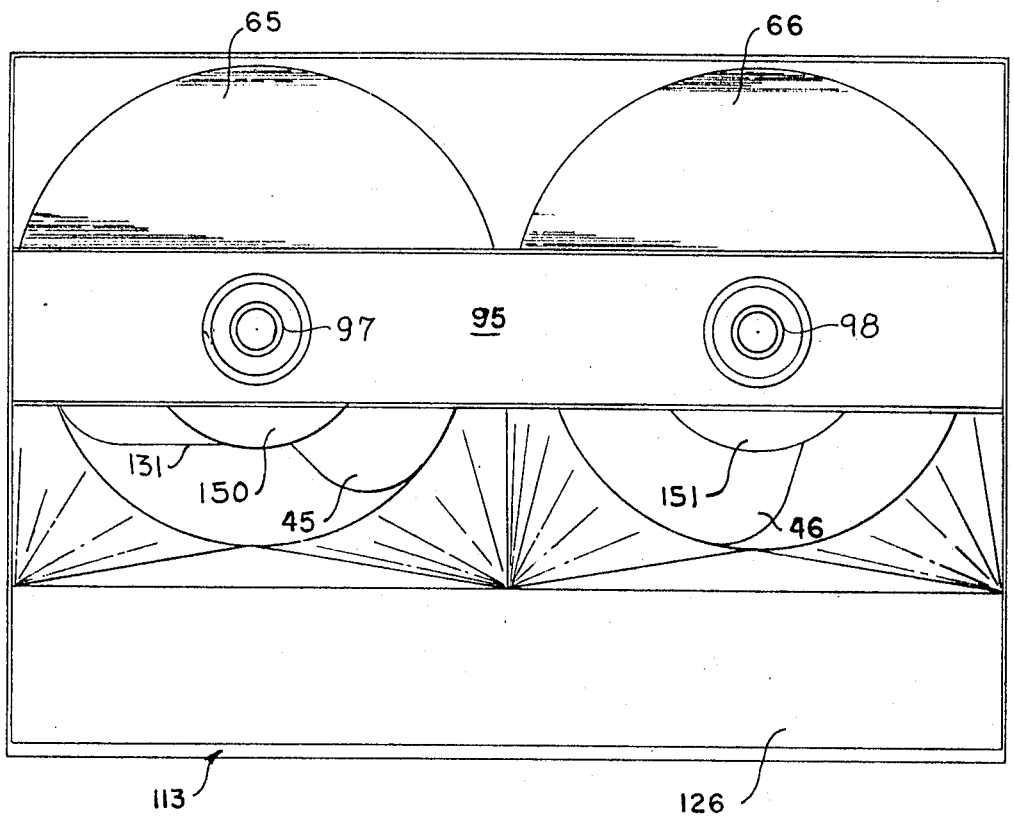
FIG. 7 is a front view of the crop-feeding means.
Figure 8:
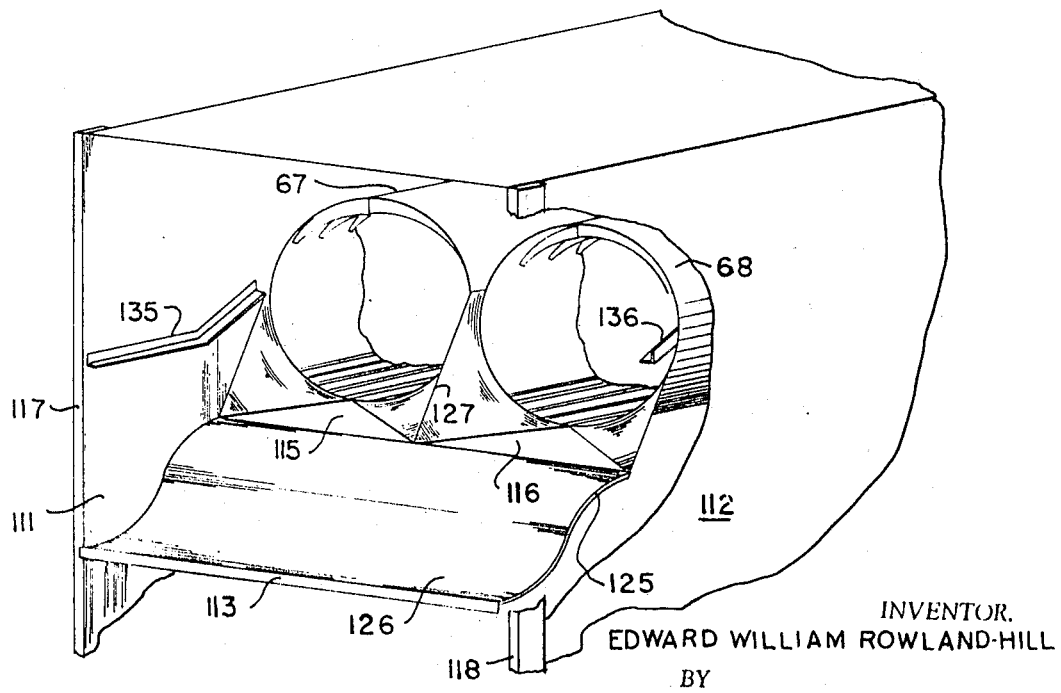
FIG. 8 is a perspective view of the casing of the crop-feeding means without the feed augers and threshing rotors.

Each of the shafts 37,38 have two flights 45a, b and 46a, b (FIGS. 4 and 5) corresponding to their respective longitudinal edges on the threshing rotors. The flights are circumferentially 180° apart and taper at the forward ends to fit within the conical antiwrap shields 150,151. Each of the flights are a full turn. The first quarter turn of the flights are forward of the commencement of the convex portion 125 of the ramp (FIG. 3). A passage is provided between the ramp and the back surface of the first quarter turn of a respective auger flight when in the downward projecting position. When the auger flights are adjacent a respective convex portion at the top end of the ramp, the flights are sheared as indicated at 130,131,132,133, respectively, (FIG. 5) to provide space between the edge of the auger and the ramp. These two positions are also illustrated in FIG. 7 in which the ramp 113, transition portions 115,116 and the front edge of the concaves 55,56 are viewed from the front and the direction in which the crop is proceeding into the combine. The auger 46 has the first quarter of the flight 46a extending down and forward of the convex portion 125 so the crops can feed in back of this portion of a flight. The auger 45 is shown with the shear 131 of flight 45a generally parallel to the ramp and spaced (FIG. 5) to permit the crops to move over the portion 125. The first quarter of the other flight 45b is moving down into the lower position similar to the first quarter of flight 45a. This passage provides ample space for the crop to move up into the midportions of the auger flights. Thus there is a continuous passage for the crop to slide up the ramp underneath and back of the leading quarter turns of the flight into the midportions of the augers. As the flights rotate the crop material is moved rearwardly and circumferentially against the strippers 135,136. The last quarter of the flights sweep the crop into the threshing and separating section.

The stripper bars or members 135,136 are along the sides of the crop-feeding means. The auger flights carry the crop against the bars so that the crop material is moved axially by the latter portion of the auger flights. The bars are positioned to follow the concaves so material is delivered immediately after the threshing rotors have left the concaves. The auger flights 45a, b and 46a, b have terminating ends ahead of the respective rasp bars 87,88 at 138,139,140,141 (FIG. 3). The crop is introduced ahead of a respective rotor by the terminating ends and subsequent to the respective concaves by the stripper bars. The crop then may arrange in a proper crop mat as it is carried over the rotor along the top portions 67,68 of cylinder casings. The threshing and separating rotor ends of the stripper bars 135,136 are angled in the direction of rotation so that the crop will be moving circumferentially in the direction of rotation of the rotors. This assists in the arrangement of the crop mat.

Antiwrap Means

Figure 9:
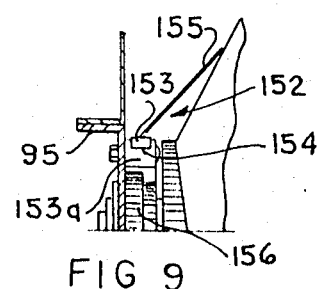
FIG. 9 is an axial threshing view of another embodiment of the antiwrap shield.
Figure 6:
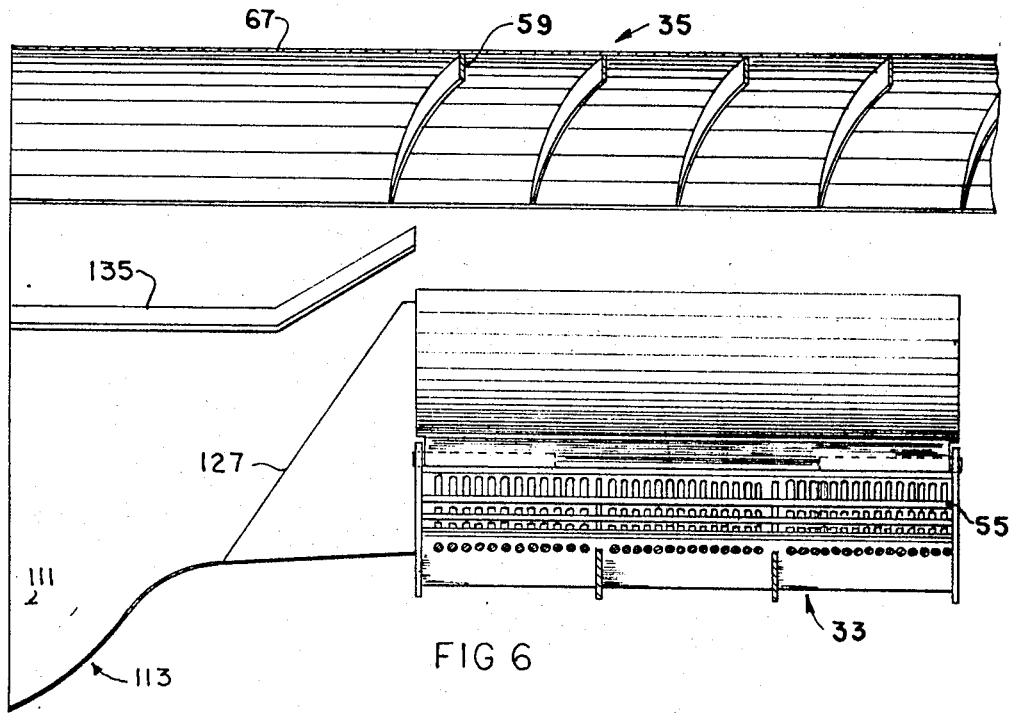
FIG. 6 is an inner side view of the casing of the crop-feeding means and the threshing and separating section.
Figure 5:
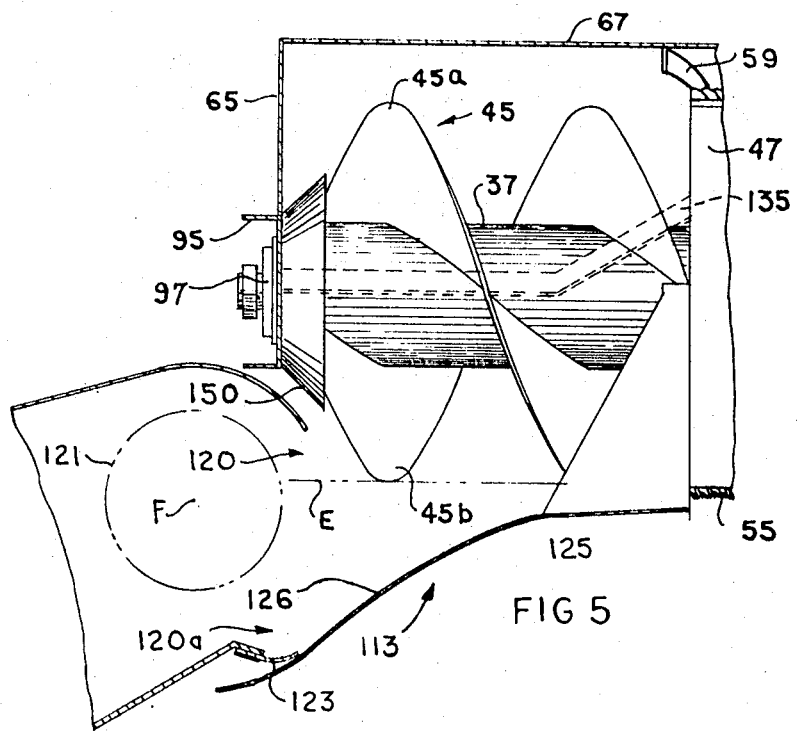
FIG. 5 is a sectional view of the crop elevator and right feeding means taken along the lines 5—5 of FIG. 3.

At the intake end of the augers 45,46 are preferably preceded by cone-shaped members or antiwrap shields 150,151. These shields are fixedly attached to the beam 95. However, it may be desirable to rotate the shields relative to the beam. In FIG. 9 a rotatable embodiment is shown in which a member or shield 152 has an annular collar 153 in rotatably relation with a mounting 153a fixedly attached to the beam 95. The collar is held axially by fitting in an annular groove 154 in the mounting. A conical portion 155 extends circumferentially completely around the shaft and flaring radially outwardly from the shaft in the direction towards the respective auger and the discharge end of the threshing and separating units. The antiwrap shields protect the bearing means 156 rotatably supporting the shaft in the beam. The peripheral edge of the conical portion is spaced from the casing to permit the entry of crops. The leading end of the respective helical flight extends within and radially overlaps with the conical member. The cone-shaped member or antiwrap shield prevents the fouling of the shaft by entering crop material that may become entwined.

Summary of Features and Advantages

The continuous, unimpeded flow of all types of crops from the header to the threshing rotor has been attained with the use of conventional crop elevators. The crop-feeding means operates over the wide range of rotor speeds depending on the threshing requirements and draws cut crops delivered by the crop elevator into the threshing and separating units. The crops are introduced into the threshing rotor and the crop mat is formed by the time the rotors reach the concaves for the threshing action. The inward feed of the crop under the auger flights and then the upward turning of the crop by the ramp introduces the crop in a sidewise or generally radial direction which is generally along the flight surfaces rather than against the flight surfaces as in axial or longitudinal feeding. The generally medial feeding provides for a rapid grasp or engagement of the cut crops by the auger flights. The crops are moved rapidly over a quarter turn against the stripper bars for axial movement of the cut crops towards the threshing rotors. The relieved angle portion of the bars permit a circumferential component to the movement of the crops for better grasping of the crops by the rotors.

A particular advantage of this invention is the short and minimum space the crop-feeding means requires. The length of the crop-feeding augers is about the same as the diameter of the pitch. The space underneath the threshing and separating units does not enlarge the combine but utilizes space made available by the other components of the combine so that the height of the combine is not increased to accommodate the opening and space for passing the crops.

Although the foregoing description is in connection with multiple threshing and separating units, the crop-feeding means may also be used to feed a single threshing and separating unit. The single unit would preferably be positioned in the middle of the combine and a single converging portion would connect the threshing section with the ramp.

While the invention has been described, it will be understood that it is capable of further modifications and this application is intended to cover any variations, uses, or adaptions of the invention following in general, the principles of the invention and including such departures from the present disclosure as come within known or customary practice in the art to which the invention pertains, and as may be applied to the essential features hereinbefore set forth and as fall within the scope of the invention or limits of the appended claims.

Having thus described my invention, what I claim is:

1. An axial flow combine comprising
a casing having a forward portion with a front end,
a shaft extending axially through said casing and rotatable in relation thereto,
longitudinally extending threshing and separating means within said casing spaced from said front end and mounted on said shaft,
crop-feeding means between said front end and said threshing and separating means including means on said shaft extending outwardly from said shaft for cooperating in the feeding of crops into said casing and in a direction along said shaft to said threshing and separating means and having a forward part and including upwardly sloped means in the bottom of the forward portion of said casing and underneath said shaft-supported feeding means, said upwardly sloped means spaced below said front end to form a crop passing opening therewith and extending upwardly and rearwardly underneath said shaft-supported feeding means and spaced in the direction of feed from the forward part of said feeding means for delivering crops in a generally upward direction to an intermediate portion of said shaft-supported feeding means.

2. An axial flow combine as set forth in claim 1, wherein antiwrap means is provided and mounted on the casing at the front end of said shaft and extending rearwardly in overlapping relation with said shaft-mounted feeding means to prevent accumulation of crops around the end of said shaft.

3. An axial flow combine as set forth in claim 1, wherein there is provided a second casing extending parallel to and in adjacent side-by-side relation with said first casing and having a second forward portion with a second front end in side-by-side relation with said first front end, a second shaft extending axially through said second casing and rotatable relation thereto, second longitudinally extending threshing and separating means on said second shaft and spaced from said second front end within said second casing, second crop-feeding means between said second front end and said second threshing and separating means including second means on said second shaft extending outwardly from said second shaft for cooperating in the feeding of crops into said second casing and in a direction along said second shaft to said second threshing and separating means and having a second forward part and including second upwardly sloped means in the bottom of the second forward portion of said second casing underneath said second feeding means, said second upwardly sloped means spaced below said second front end to form a crop passing opening therewith and extending upwardly and rearwardly underneath said second shaft-supported feeding means and spaced in the direction of feed from the second forward part of said second shaft-supported feeding means for delivering crops in a generally upward direction to an intermediate portion of said second shaft-supported feeding means.

4. An axial flow combine as set forth in claim 3 wherein a second antiwrap means is provided and affixed to said second casing at the front end of said second shaft to extend rearwardly around said second shaft to prevent accumulation of crops around the end of said second shaft.

5. An axial flow combine as set forth in claim 1 wherein feeding means on said shaft is a flightlike means and said forward part thereof has a rearward facing surface, said upwardly sloped means spaced in the direction of feed from said surface, when said surface is below said shaft, for delivery of crop material rearward of said forward part.

6. An axial flow combine as set forth in claim 5, wherein said flightlike means is an auger means.

7. An axial flow combine as set forth in claim 6 wherein said auger means has sheared edges to space said auger means from said upwardly sloped means to provide a passage for crops into said auger means.

8. An axial flow combine as set forth in claim 1 wherein said upwardly sloped means is a linear element surface extending across the width of the combine.

9. In an axial flow threshing and separating machine having a frame, a casing supported in said frame, a shaft with an end rotatably supported in said frame, means on said shaft at said end for feeding crops through said casing, and antiwrap means at said end of said shaft and extending rearwardly over said shaft and said crop-feeding means to prevent wrapping of crops around the end of said shaft.

10. In an axial flow threshing and separating machine as set forth in claim 9 wherein said antiwrap means is firmly attached to said frame.

11. In an axial flow threshing and separating machine as set forth in claim 10 wherein said antiwrap means is conical in shape.

12. In an axial flow threshing and separating means as set forth in claim 9 wherein said antiwrap means comprises a collar mounted on said frame and a conical shaped member rotatably mounted on said collar and extending over said end of said shaft.

13. In an axial flow threshing and separating means as set forth in claim 12 wherein said conical-shaped member has a ring rotatably mounted around said collar to permit rotation of said conical-shaped member in relation to said collar and frame.

* * * * *